United States Patent
Hayashi et al.

(10) Patent No.: US 12,282,810 B2
(45) Date of Patent: Apr. 22, 2025

(54) NONLINEAR FUNCTION OPERATION APPARATUS, SIGMOID FUNCTION OPERATION APPARATUS, HYPERBOLIC TANGENT FUNCTION OPERATION APPARATUS, SOFTMAX FUNCTION OPERATION APPARATUS, AND NONLINEAR FUNCTION OPERATION METHODS

(71) Applicant: SOLITON SYSTEMS K.K., Tokyo (JP)

(72) Inventors: Teruhiko Hayashi, Tokyo (JP); Kenich Hashimoto, Tokyo (JP); Kunihiro Kajihara, Tokyo (JP); Kazuhisa Takamura, Tokyo (JP)

(73) Assignee: SOLITON SYSTEMS K.K., Tokyo (JP)

( * ) Notice: Subject to any disclaimer, the term of this patent is extended or adjusted under 35 U.S.C. 154(b) by 0 days.

(21) Appl. No.: 18/721,658

(22) PCT Filed: Dec. 23, 2022

(86) PCT No.: PCT/JP2022/047733
§ 371 (c)(1),
(2) Date: Jun. 18, 2024

(87) PCT Pub. No.: WO2023/120723
PCT Pub. Date: Jun. 29, 2023

(65) Prior Publication Data
US 2025/0061293 A1 Feb. 20, 2025

(30) Foreign Application Priority Data
Dec. 23, 2021 (JP) .................. 2021-210012

(51) Int. Cl.
*G06G 7/12* (2006.01)
*G06F 17/18* (2006.01)

(52) U.S. Cl.
CPC ............... *G06G 7/12* (2013.01); *G06F 17/18* (2013.01)

(58) Field of Classification Search
CPC ........................ G06G 7/12–28; G06F 17/18
See application file for complete search history.

(56) References Cited

U.S. PATENT DOCUMENTS

| 2015/0192664 | A1 | 7/2015 | Sato et al. |
| 2017/0364791 | A1* | 12/2017 | Miyashita ............. G06F 7/5443 |
| 2021/0366542 | A1 | 11/2021 | Lee et al. |

FOREIGN PATENT DOCUMENTS

| JP | 2000-057241 A | 2/2000 |
| JP | 09-305687 A | 7/2001 |

(Continued)

OTHER PUBLICATIONS

Bhanja et al., "OTA-Based Logarithmic Circuit for Arbitrary Input Signal and Its Application" IEEE Transactions on Very Large Scale Integration (VLSI) Systems, vol. 24, No. 2, Feb. 2016 (Year: 2016).*

(Continued)

*Primary Examiner* — John C Kuan
(74) *Attorney, Agent, or Firm* — Alston & Bird LLP

(57) ABSTRACT

An aspect of the present invention includes: a nonlinear behavior unit configured to autonomously change an internal physical quantity according to a predetermined nonlinear characteristic; an input converting unit configured to convert an input signal into temporal information using a parameter indicating the predetermined nonlinear characteristic; a controlling unit configured to control the nonlinear behavior unit to start, after initializing the nonlinear behavior unit, a change in the internal physical quantity of the nonlinear behavior unit when the input signal is inputted to the input converting unit, and to stop, after an elapse of the temporal information, the change in the internal physical quantity of (Continued)

the nonlinear behavior unit; an arithmetic operation result output unit configured to output the internal physical quantity at a time when the change in the internal physical quantity is stopped as an arithmetic operation result of a nonlinear function having the predetermined nonlinear characteristic.

14 Claims, 13 Drawing Sheets

(56) References Cited

FOREIGN PATENT DOCUMENTS

| JP | 2009-187497 A | | 8/2009 |
|---|---|---|---|
| JP | 2021033989 A | * | 3/2021 |
| JP | 2021-185479 A | | 12/2021 |
| WO | WO 2014/041858 A | | 3/2014 |
| WO | WO 2023/120723 A1 | | 6/2023 |

OTHER PUBLICATIONS

D'Angelo et al., "A Time-mode Translinear Principle for Implementing Analog Multiplication" IEEE 2014 (Year: 2014).*

Ertik et al., "Investigation of electrical RC circuit within the framework of fractional calculus" Revista Mexicana de Fisica 61 (2015) 58-63 (Year: 2015).*

PCT/JP2022/047733 International Search Report and Written Opinion mailed Mar. 20, 2023, English translation.

* cited by examiner

NONLINEAR FUNCTION OPERATION APPARATUS, SIGMOID FUNCTION OPERATION APPARATUS, HYPERBOLIC TANGENT FUNCTION OPERATION APPARATUS, SOFTMAX FUNCTION OPERATION APPARATUS, AND NONLINEAR FUNCTION OPERATION METHODS

CROSS REFERENCE TO RELATED APPLICATIONS

This application is a National Stage Application, filed under 35 U.S.C. § 371, of International Application No. PCT/JP2022/047733, filed Dec. 23, 2022, which international application claims priority to and the benefit of Japanese Application No. 2021-210012, filed Dec. 23, 2021; the contents of both of which are hereby incorporated by reference in their entirety.

BACKGROUND

Technical Field

The present disclosure relates to a nonlinear function operation apparatus, a sigmoid function operation apparatus, a hyperbolic tangent function operation apparatus, a softmax function operation apparatus, and a nonlinear function operation methods.

Description of Related Art

Conventionally, a neuron element constituting the neural network calculates a sum of the weighted input signals and generates an output signal using an activation function which receives the sum as an argument. The activation function is a function for determining the output format of respective neuron elements, and a nonlinear function is usually used. Exemplary nonlinear activation functions include a sigmoid function, a hyperbolic tangent function, and a softmax function.

As for an arithmetic operation unit of the sigmoid function, a circuit is disclosed in which each of two output signals of a differentially amplifying unit consisting of two transistors is used to conduct a predetermined calculation to operate the sigmoid function (see Japanese Patent Application Publication No. H09-305687).

BRIEF SUMMARY

The present invention has been proposed to solve the problems of the conventional technology.

A nonlinear function operation apparatus according to an aspect of the present disclosure includes: a nonlinear behavior unit configured to autonomously change an internal physical quantity according to a predetermined nonlinear characteristic; an input converting unit configured to convert an input signal into temporal information using a parameter indicating the predetermined nonlinear characteristic; a controlling unit configured to control the nonlinear behavior unit to start, after initializing the nonlinear behavior unit, a change in the internal physical quantity of the nonlinear behavior unit when the input signal is inputted to the input converting unit, and to stop, after an elapse of the temporal information, the change in the internal physical quantity of the nonlinear behavior unit; an arithmetic operation result output unit configured to output the internal physical quantity at a time when the change in the internal physical quantity is stopped as an arithmetic operation result of a nonlinear function having the predetermined nonlinear characteristic.

According to an aspect of the present disclosure, in a method of an arithmetic operation of a nonlinear function, converting by an input converting unit an input signal into temporal information using a parameter indicating a predetermined nonlinear characteristic of the nonlinear function; controlling by a controlling unit to initialize a nonlinear behavior unit which autonomously changes an internal physical quantity according to the predetermined nonlinear characteristic, to start a change in the internal physical quantity of the nonlinear behavior unit when the input signal is inputted to the input converting unit, and to stop the change in the internal physical quantity of the nonlinear behavior unit after an elapse of the temporal information; outputting by an arithmetic operation result output unit the internal physical quantity at a time when the change in the internal physical quantity is stopped as an arithmetic operation result of the nonlinear function.

According to the present disclosure, it is possible to obtain the nonlinear function arithmetic operation result with a simple circuit-configuration, which reduces power consumption, and which is stable and highly accurate.

DETAILED DESCRIPTION OF VARIOUS EMBODIMENTS

Hereinafter, embodiments of the present invention will be described in detail with reference to the drawings.

First Embodiment

Figure 1:
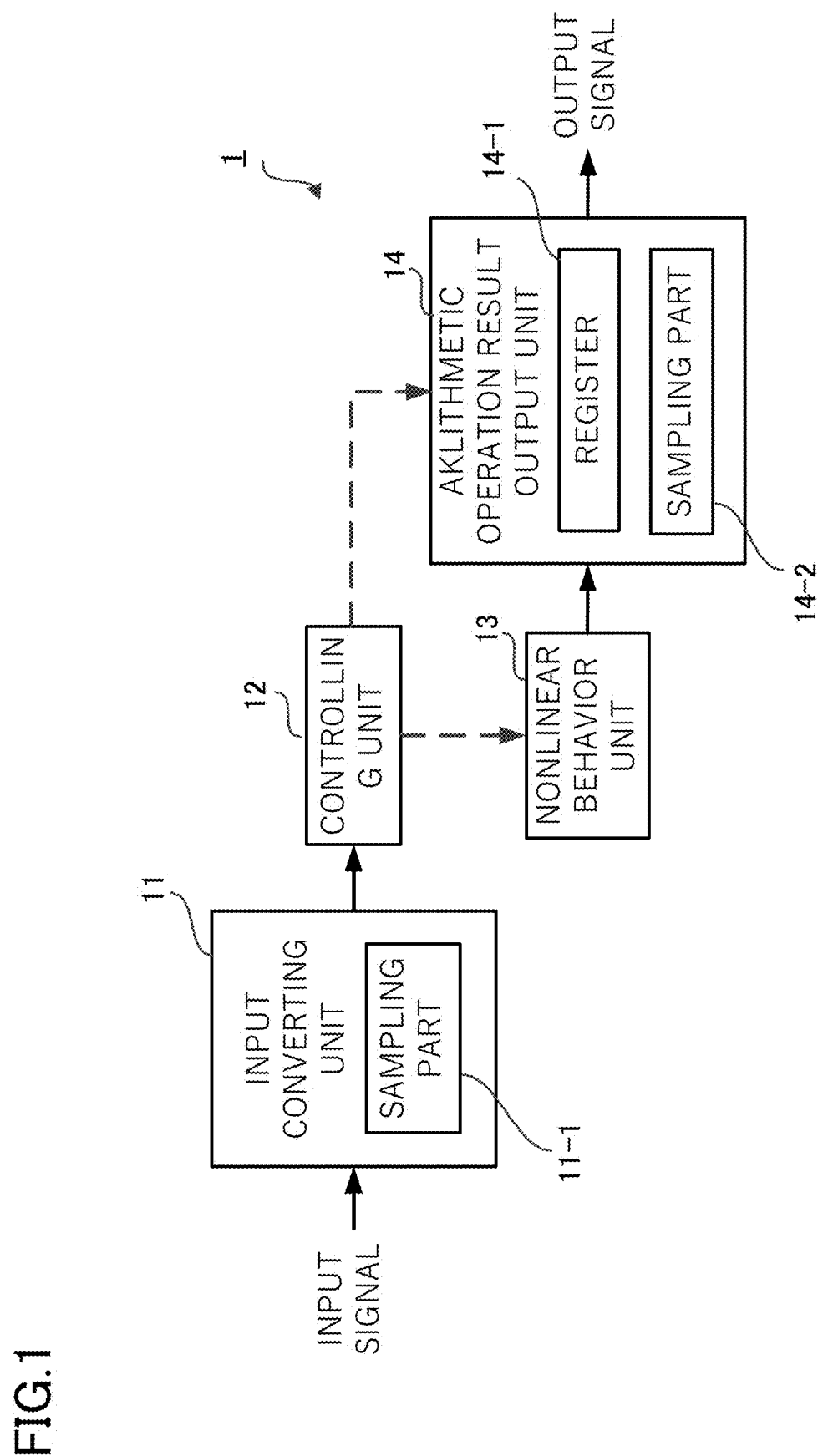
FIG. 1 is a block diagram illustrating a configuration of a nonlinear function operation apparatus.

FIG. 1 is a block diagram illustrating a configuration of a nonlinear function operation apparatus 1 according to a first embodiment. The nonlinear function operation apparatus 1 includes an input converting unit 11, a controlling unit 12, a nonlinear behavior unit 13, and an arithmetic operation result output unit 14.

The input converting unit 11 has a sampling part 11-1. The arithmetic operation result output unit 14 includes a register 14-1 and a sampling part 14-2.

The input converting unit 11 receives an input signal and converts the input signal into temporal information. The input signal may be a continuous signal or discrete signals. If the input signal is the continuous signal, the input signal is sampling into discrete signals using the sampling part 11-1 and then converted into the temporal information.

The controlling unit 12 has a built-in timer (not shown), and starts clocking after an initialization of the nonlinear behavior unit 13 is completed and when the input signal is inputted to the input converting unit 11. The controlling unit 12 controls the nonlinear behavior unit 13 or controls the arithmetic operation result output unit 14 based on the temporal information supplied from the input converting unit 11.

The nonlinear behavior unit 13 is initialized under a control of the controlling unit 12. After initialization, the nonlinear behavior unit 13 changes its internal physical quantity according to a predetermined nonlinear characteristic. The nonlinear behavior unit 13 stops the change in the internal physical quantity when the nonlinear behavior unit 13 receives a predetermined control from the controlling unit 12 during the internal physical quantity changes.

The arithmetic operation result output unit 14 measures the internal physical quantity of the nonlinear behavior unit 13 according to an instruction of the controlling unit 12, and outputs the measurement as an arithmetic operation result of a nonlinear function having the predetermined nonlinear characteristic. The arithmetic operation result output unit 14 holds the measurement results for predetermined times using the register 14-1 and re-sampling the measurement results again using the sampling part 14-2 as needed.

Figure 2:
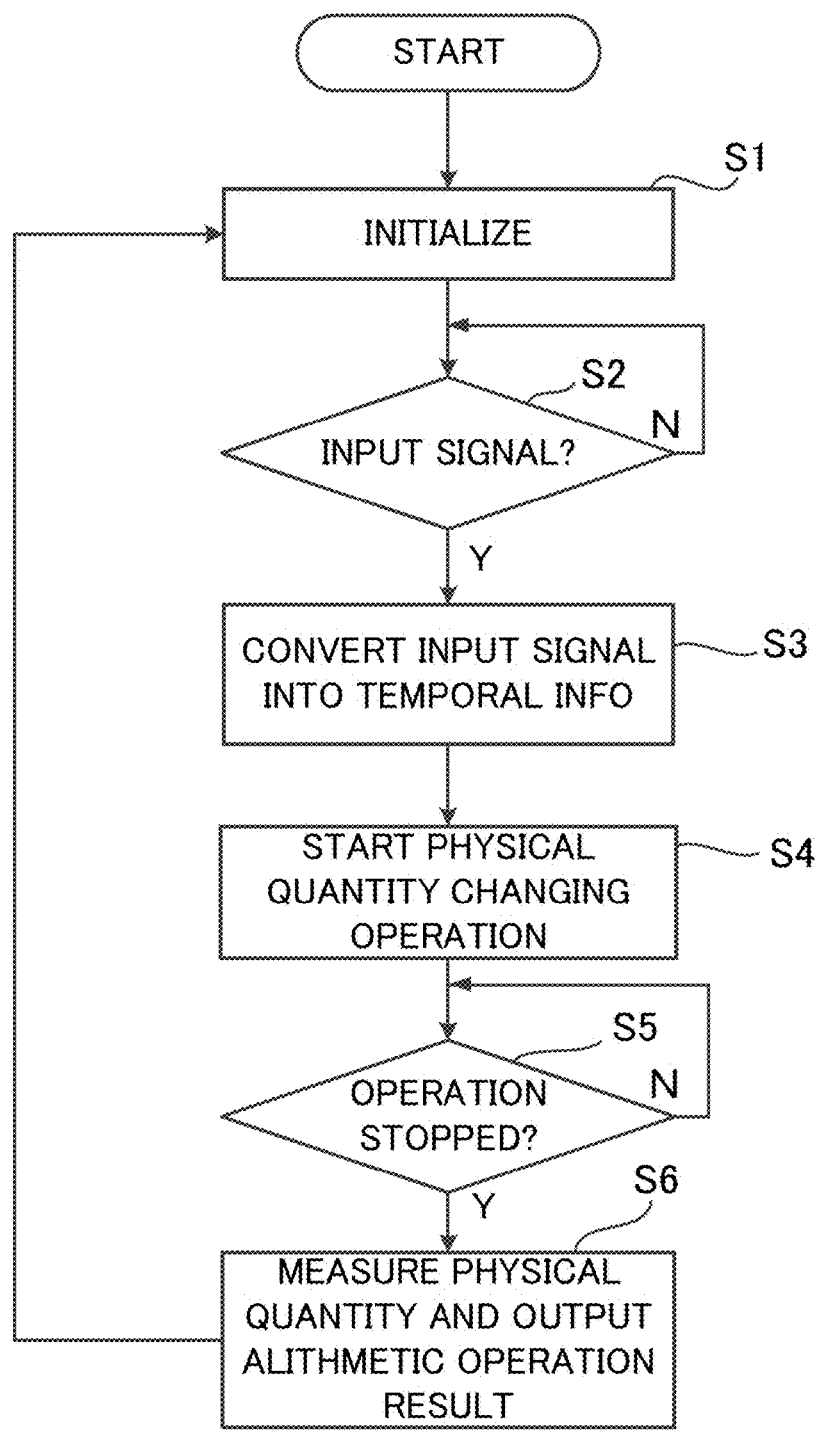
FIG. 2 is a flowchart illustrating an arithmetic operation of the nonlinear function operation apparatus.

FIG. 2 is a flowchart illustrating an arithmetic process of the nonlinear function operation apparatus 1.

In step S1, the controlling unit 12 of the nonlinear function operation apparatus 1 initializes the nonlinear behavior unit 13. This causes the nonlinear behavior unit 13 to initialize its internal physical quantity.

In step S2, the input converting unit 11 checks whether or not there is an input signal, waits until there is the input signal, and proceeds to step S3 when there is the input signal.

In step S3, the input converting unit 11 performs a predetermined conversion processing on the input signal, converts it into temporal information, and supplies it to the controlling unit 12. When the input signal is an analog signal that changes continuously, the input converting unit 11 is sampling the analog signal based on a predetermined sampling frequency using the sampling part 11-1 and then performs the predetermined conversion processing.

In step S4, when the temporal information is supplied from the input converting unit 11, the controlling unit 12 instructs the nonlinear behavior unit 13 to initiate a change in the internal physical quantity. As a result, the internal physical quantity of the nonlinear behavior unit 13 changes according to the predetermined nonlinear characteristic.

In step S5, the controlling unit 12 determines whether or not an operation of the nonlinear behavior unit 13 is to be stopped based on the temporal information supplied from the input converting unit 11, and is waiting until an affirmative determination is reached. Then, when the controlling unit 12 determines affirmative, the operation of the nonlinear behavior unit 13 is stopped. As a result, the change in the internal physical quantity of the nonlinear behavior unit 13 is stopped.

In step S6, the controlling unit 12 causes the arithmetic operation result output unit 14 to measure the internal physical quantity of the nonlinear behavior unit 13. The arithmetic operation result output unit 14 outputs the measured data as an arithmetic operation result of a nonlinear function having the predetermined nonlinear characteristic. Then, the arithmetic operation returns to step S1.

In step S6, the arithmetic operation result output unit 14 may hold the measurement result in the register 14-1 for a predetermined period as needed, and may output the held measurement result independently of a change in the internal physical quantity of the nonlinear behavior unit 13. Further, the arithmetic operation result output unit 14 may use the sampling part 14-2 for re-sampling the measured data held in the register 14-1 and output the re-sampled measured data.

Figure 3:
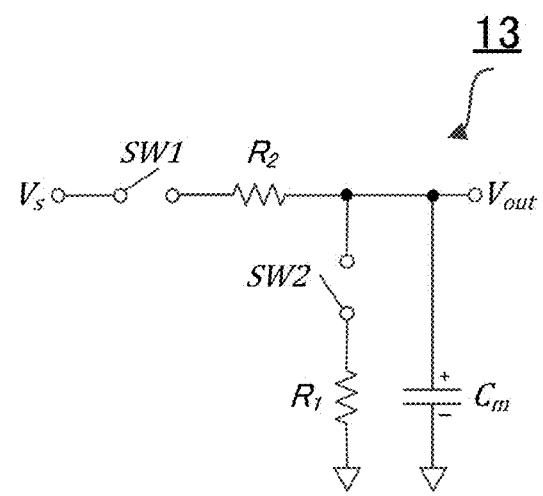
FIG. 3 is a circuit diagram illustrating an exemplary nonlinear behavior unit.

FIG. 3 is a circuit diagram illustrating an exemplary nonlinear behavior unit 13. The nonlinear behavior unit 13 includes a switch SW1, a switch SW2, resistors $R_1$ and $R_2$, and a capacitor $C_m$. Note that the resistor $R_1$ is a resistive load and the resistor $R_2$ is a current controlling resistance.

One end of the switch SW1 is connected to a power supply $V_s$. The other end of the switch SW1 is, via the resistor $R_2$, connected to an output terminal $V_{out}$, one end of the switch SW2, and a positive-electrode terminal of the capacitor $C_m$. The other end of the switch SW2 is connected to one end of the resistor $R_1$. The other end of the resistor $R_1$ is grounded. A negative-electrode terminal of the capacitor $C_m$ is also grounded. The switch SW1 and the switch SW2 are turned on/off by the controlling unit 12 shown in FIG. 1.

The nonlinear behavior unit 13 shown in FIG. 3 is configured as a RC parallel circuit. A transient characteristic of the nonlinear behavior unit 13 is as shown in Equation (1) and is an inverse of the natural exponential function.

$$V_{out}/V_s = \exp(-t/(C_m R_1)) = \exp(-x) \tag{1}$$

Here, temporal information t is given by Equation (2) using an input signal x and a time constant $C_m R_1$ of the RC parallel circuit.

$$t = C_m R_1 \cdot x \tag{2}$$

Figure 4:
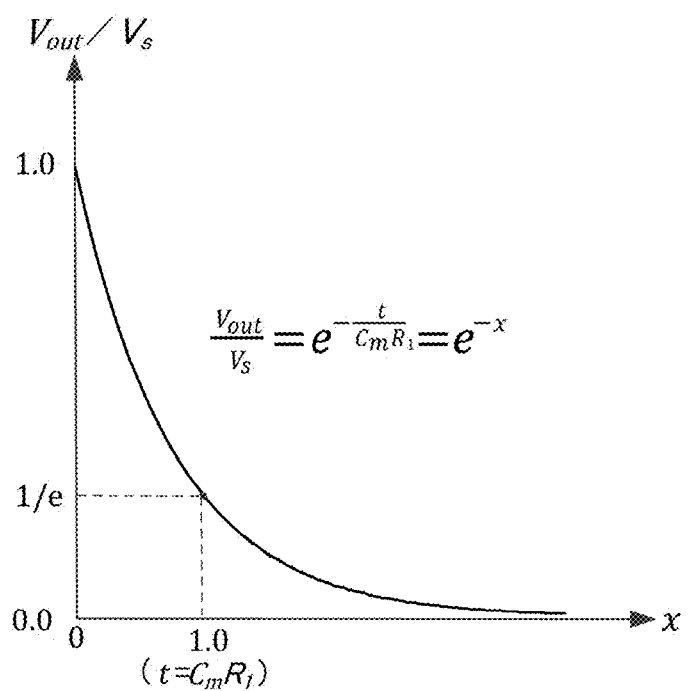
FIG. 4 is a diagram illustrating a transient characteristic of the nonlinear behavior unit.

FIG. 4 is a diagram illustrating the transient characteristic of the nonlinear behavior unit 13 shown in FIG. 3. The horizontal axis represents the input signal x associated with the temporal information t in Equation (2), and the vertical axis represents an output-voltage normalized by the power supply voltage $V_s$ ($V_{out}/V_s$).

The controlling unit 12 turns on the switch SW1 and turns off the switch SW2 as an initialization process. As a result, the power supply $V_s$ supplies charges to the capacitor $C_m$ via the resistor $R_2$. The capacitor $C_m$ is then fully charged by the power supply $V_s$. After detecting the input signal x, the input converting unit 11 converts the input signal x into the temporal information t using Equation (2).

Next, the controlling unit 12 sets the built-in timer and starts counting, and then turns off the switch SW1 and turns on the switch SW2. As a result, the charges accumulated in the capacitor $C_m$ are discharged through the resistor $R_1$. The controlling unit 12 turns off the switch SW2 when the counting by the built-in timer reaches the temporal information t obtained in Equation (2). Note that the switch SW1 remains off.

The arithmetic operation result output unit 14 measures the output-voltage $V_{out}$ of the nonlinear behavior unit 13 and outputs this measured value to an outside as the arithmetic operation result of the nonlinear function according to Equation (1). The arithmetic operation result output unit 14 may hold the measured value of the output-voltage $V_{out}$ in the register 14-1 regardless of a status of the nonlinear behavior unit 13. In addition, the arithmetic operation result output unit 14 may output the measured output-voltage $V_{out}$ held in the register 14-1 as quantized information on a basis of a predetermined sampling frequency using the sampling part 14-2.

So far, it is assumed that the input signal x is equal to or greater than 0. If the input signal x is less than 0, however, one should obtain a reciprocal of the measured value of the output-voltage $V_{out}$.

Now, for the input signal x≥0, we define a reciprocal of the natural exponential function $e^{-x}$, as an exemplary nonlinear function, as follows:

$$EX(x) = e^{-x} (x \geq 0) \quad (3)$$

For any input signal x, the reciprocal of the natural exponential function $e^{-x}$ would be:

$$e^{-x} = EX(x)\,(x \geq 0) \quad (4)$$
$$= 1/(EX(-|x|))\,(x < 0)$$

Figure 5:
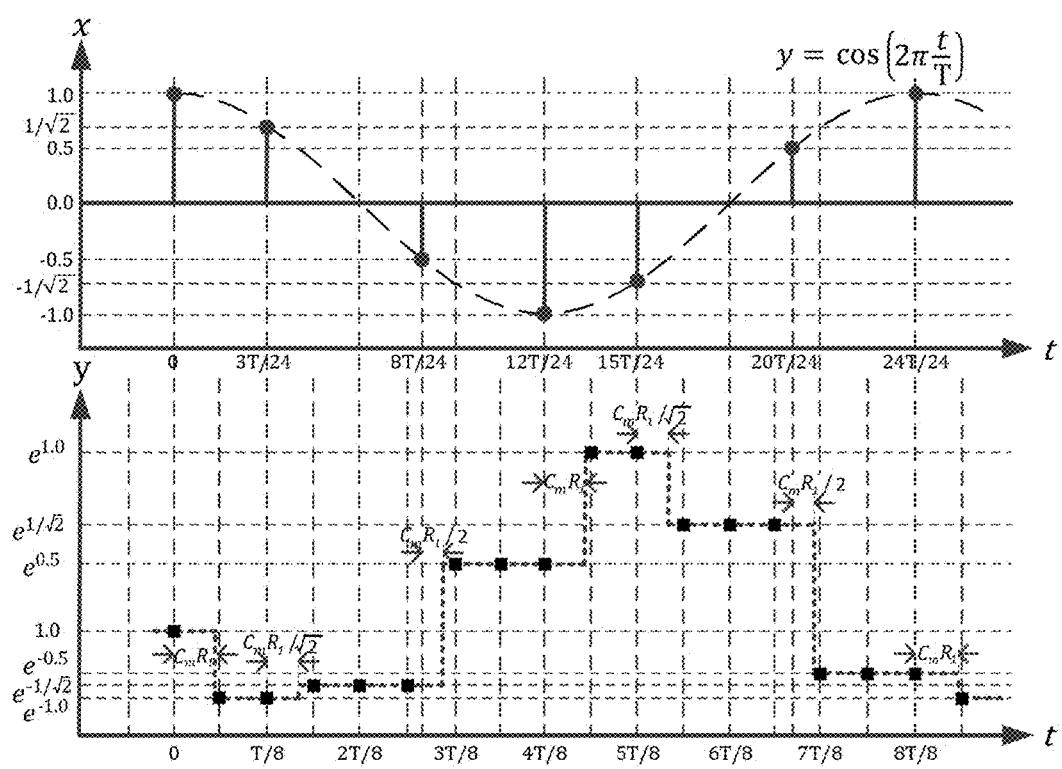
FIG. 5 is a diagram illustrating arithmetic operation results of the nonlinear function operation apparatus when input signals based on a cosine wave are inputted.

FIG. 5 is a diagram illustrating arithmetic operation results when cosine wave-based signals are inputted as the input signals x to the nonlinear function operation apparatus 1. Specifically, the input signals x are sampling signals at any time-intervals based on the cosine wave (period T) normalized to a range of −1.0 to 1.0.

It should be noted that the arithmetic operation result output unit 14 holds the arithmetic operation result of a previous input signal x in the register 14-1 until an arithmetic operation result of a new input signal x is obtained, and outputs the held arithmetic operation result being re-sampled with a T/16 cycle using the sampling part 14-2 as output signals y. Here, the processing delay and the like associated with a parasitic capacitance and the like of the nonlinear behavior unit 13 are ignored.

At t=0, the input signal is x=1.0. From this, the arithmetic operation result y=$e^{-1.0}$ is outputted at a time point t=$C_mR_1$, which is the point of $C_mR_1$ delay from the input signal x entry. Then, the initialization process is executed, and the capacitor $C_m$ is recharged.

At t=3T/24, the input signal is x=1/√2. From this, the arithmetic operation result y=$e^{-1/\sqrt{2}}$ is outputted at a time point t=3T/24+$C_mR_1$/√2, which is the point of $C_mR_1$/√2 delay from the input signal x entry. Then, the initialization process is executed, and the capacitor $C_m$ is recharged.

At t=8T/24, the input signal is x=−0.5. From this, the arithmetic operation result y=$e^{0.5}$ is outputted at a time point t=8T/24+$C_mR_1$/2, which is the point of $C_mR_1$/2 delay from the input signal x entry. Then, the initialization process is executed, and the capacitor $C_m$ is recharged.

At t=12T/24, the input signal is x=−1.0. From this, the arithmetic operation result y=$e^{1.0}$ is outputted at a time point t=12T/24+$C_mR_1$, which is the point of $C_mR_1$ delay from the input signal x entry. Then, the initialization process is executed, and the capacitor $C_m$ is recharged.

At t=15T/24, the input signal x is x=−1/√2. From this, the arithmetic operation result y=$e^{1/\sqrt{2}}$ is outputted at a time point t=15T/24+$C_mR_1$/√2, which is the point of $C_mR_1$/√2 delay from the input signal x entry. Then, the initialization process is executed, and the capacitor $C_m$ is recharged.

At t=20T/24, the input signal is x=0.5. From this, the arithmetic operation result y=$e^{-0.5}$ is outputted at a time point t=20T/24+$C_mR_1$/2, which is the point of $C_mR_1$/2 delay from the input signal x entry. Then, the initialization process is executed, and the capacitor $C_m$ is recharged.

At t=24T/24, the input signal is x=1.0. From this, the arithmetic operation result y=$e^{-1.0}$ is outputted at a time point t=24T/24+$C_mR_1$, which is the point of $C_mR_1$ delay from the input signal x entry. Then, the initialization process is executed, and the capacitor $C_m$ is recharged.

As is clear from FIG. 5, in the nonlinear function operation apparatus 1, if the input signals is sampling signals at any time intervals, the input time intervals thereof need to be sufficiently longer than the time constant $C_mR_1$ of the nonlinear behavior unit 13. Similarly, when the input signal x is a continuous analog signal, a sampling period for the analog signal x being sampling using the sampling part 11-1 is required to be sufficiently longer than the time constant $C_mR_1$ of the nonlinear behavior unit 13.

Specifically, if the maximum value of the input signal x denotes $x_{max}$ and the sampling is performed at any time intervals, the nonlinear behavior unit 13 may not accept a subsequent input signal x during a period of $C_mR_1 \cdot x_{max}$ from a start of the arithmetic operation (the start of discharging). Therefore, their input-time intervals need to be longer than $C_mR_1 \cdot x_{max}$. Also, if the input signal x is a continuous analog-signal, this is equivalent to the sampling frequency $f_s$ of the sampling part 11-1 for the input signal x having to satisfy Equation (5).

$$f_s < 1/(C_mR_1 \cdot x_{max}) \quad (5)$$

It should be noted that in the sampling part 14-2 which is re-sampling at a time of outputting, the re-sampling frequency $f_{rs}$ of the sampling part 14-2 is required to be sufficiently larger than the sampling frequency $f_s$ for the input signal x. For example, in a period t=0 to T/8 in FIG. 5, the arithmetic operation result of the input signal x=1.0 at t=0 is obtained after t=$C_mR_1$, which is the point of $C_mR_1$ delay from the input signal x entry.

On the other hand, when a new input signal x is inputted at t=T/8, if the input signal x is x=0.0, the arithmetic operation result y=1.0 can be obtained without delay. In other words, the arithmetic operation result of the input signal x at t=0 is obtained only in an interval t=$C_mR_1$ to T/8. Therefore, in order to obtain the arithmetic operation result y of the input signal x at t=0, at least one sampling must be performed within the interval t=$C_mR_1$ to T/8.

This is generalized as follows. When a sampling period (an input time interval) of an input signal according to the sampling part 11-1 is set to 1/$f_s$, a period of $C_mR_1 \cdot x_{max}$ is occupied by the arithmetic operation at longest within one cycle, and a signal-output is delayed accordingly. The arithmetic operation result is then actually obtained only within a period of $(1/f_s)-C_m R_1 x_{max}$. Therefore, in order for at least one re-sampling for the output y to be performed by the sampling part 14-2 within that period, the re-sampling frequency $f_{rs}$ needs to satisfy Equation (6).

$$f_{rs} > 1/((1/f_s) - C_m R_1 x_{max}) \qquad (6)$$

Note that in the neural network, neuron elements at a subsequent layer are processed at a stage where all the neuron elements included in a previous layer are outputted. In other words, operations of the neuron elements in each layer are synchronized. Therefore, Equation (5) is also a constraint for the nonlinear function operation apparatus 1 to be used at each of the neuron elements in the neural network.

Second Embodiment

Next, a second embodiment will be described. The same components as those in the first embodiment are denoted by the same reference numerals, and detailed description thereof will be omitted. In the second embodiment, a nonlinear behavior unit 13A shown in FIG. 6 is used as another exemplary nonlinear behavior unit 13 shown in FIG. 1.

Figure 6:
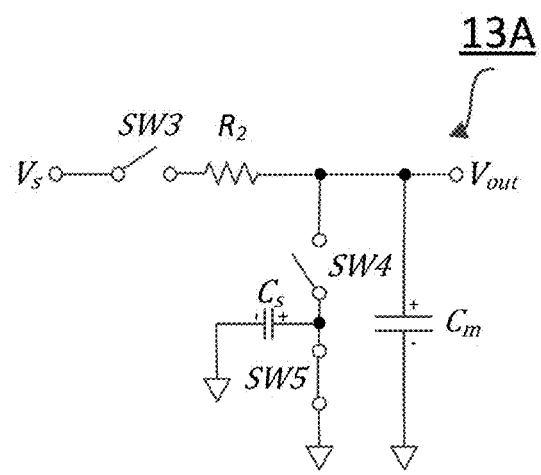
FIG. 6 is a circuit diagram illustrating an exemplary nonlinear behavior unit.

FIG. 6 is a circuit diagram illustrating the exemplary nonlinear behavior unit 13A. The nonlinear behavior unit 13A implements the switched capacitor circuit. The nonlinear behavior unit 13A includes switches SW3, SW4, SW5, a resistor $R_2$, and capacitors $C_s$, $C_m$. The resistor $R_2$ is a current controlling resistance.

One end of the switch SW3 is connected to a power supply $V_s$. The other end of the switch SW3 is, via the resistor $R_2$, connected to an output terminal $V_{out}$, one end of the switch SW4, and a positive-electrode terminal of the capacitor $C_m$. The other end of the switch SW4 is connected to one end of the switch SW5 and the positive-electrode terminal of the capacitor $C_s$. Negative-electrode terminals of the capacitors $C_s$, $C_m$, and the other end of the switch SW5 are grounded. The switches SW3, SW4, SW5 are turned on/off by the controlling unit 12 shown in FIG. 1. The switch SW4 and the switch SW5 operate exclusively. That is, when the switch SW4 is turned on, the switch SW5 is turned off, and when the switch SW4 is turned off, the switch SW5 is turned on.

In an initialization process, the controlling unit 12 controls the switch SW3 of the nonlinear behavior unit 13A to be on and the switch SW4 to be off (the switch SW5 is thus to be on). As a result, the power supply $V_s$ supplies charges to the capacitor $C_m$ via the resistor $R_2$. The capacitor $C_m$ is then fully charged with the power supply $V_s$. On the other hands, the capacitor $C_s$ is completely discharged.

When a signal is inputted to the input converting unit 11, the controlling unit 12 first turns off the switch SW3 after turning off the switch SW4 (turning on the switch SW5), and then continuously switches the switch SW4 and the switch SW5.

When the switch SW4 is on (the switch SW5 is off), the charges accumulated in the capacitor $C_m$ are shared between the capacitor $C_m$ and $C_s$, and a voltage of the capacitor $C_m$ decreases. Next, when the switch SW4 is turned off (the switch SW5 is turned on), the charges accumulated in the capacitor $C_s$ are discharged. When the switch SW4 is turned on (the switch SW5 is turned off) again, the charges remaining in the capacitor $C_m$ are shared between the capacitor $C_m$ and $C_s$, and the voltage of the capacitor $C_m$ further decreases.

That is, when the switch SW4 and the switch SW5 are switched exclusively and continuously, the voltage of the capacitor $C_m$ decreases stepwise.

Figure 7:
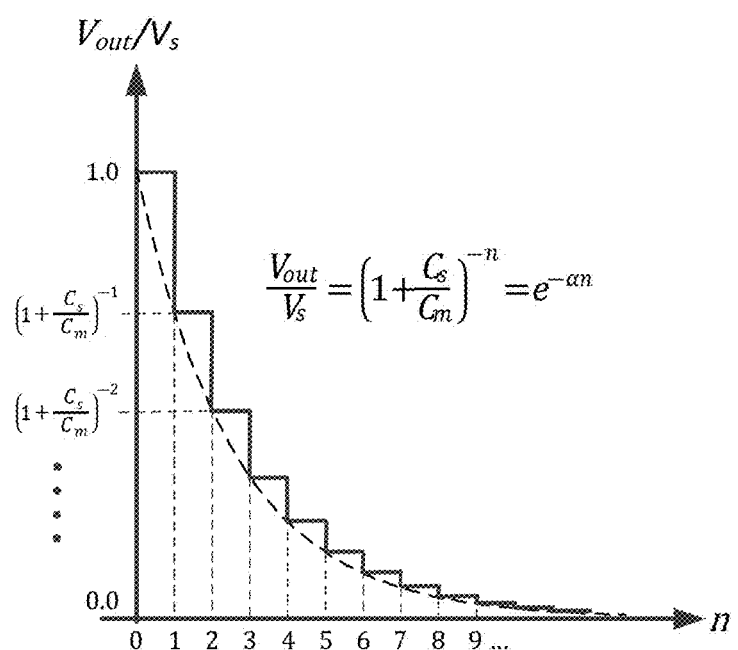
FIG. 7 is a diagram illustrating a relation between the number of switching n and normalized output-voltage $V_{out}/V_s$ of the nonlinear behavior unit.

FIG. 7 is a diagram illustrating a relation between the number of switching n of the switch SW4 and the switch SW5, and output-voltage normalized by the power supply voltage $V_s$ ($V_{out}/V_s$).

When a signal is inputted to the input converting unit 11 and the nonlinear behavior unit 13 starts to operate, the switch SW4 is switched between on, off, on, off . . . On the other hand, the switch SW5 is switched off, on, off, on . . . in conjunction with the switch SW4.

When the switch SW4 is turned on for the n-th time (the switch SW4 is turned off for the n-th time), the normalized output-voltage $V_{out}/V_s$ of the nonlinear behavior unit 13 is as shown in Equation (7).

$$V_{out}/V_s = (C_m/(C_m + C_s))^n \qquad (7)$$
$$= (1 + C_s/C_m)^{-n}$$
$$= e^{-\alpha n}$$

Here, $\alpha$ is as shown in Equation (8).

$$\alpha = \ln(1 + C_s/C_m) \qquad (8)$$

Assuming that an input signal x is inputted, a number of switching n of the switch SW4 and the switch SW5 are as shown in Equation (9).

$$n = [x/\alpha] \qquad (9)$$

Note that [z] is the Gaussian symbol representing the largest integer equal to or less than a real number z.

In the present embodiment, the controlling unit 12 calculates the number of switching n of the switch SW4 and the switch SW5 by using Equation (9) as a conversion of the input signal into the temporal information.

In the nonlinear behavior unit 13A, after the switch SW4 is switched n times, the arithmetic operation result output unit 14 may measure the output-voltage $V_{out}$ of the nonlinear behavior unit 13A as an arithmetic operation result of the nonlinear function operation apparatus 1.

Next, a case where the switch SW4 and the switch SW5 are switched at very high speed under $C_m \gg C_s$ conditions (n≫1) will be considered.

At this time, when an on/off number of switching of the switch SW4 and the switch SW5 per unit time (hereinafter, referred to as "the switching frequency") is set to $f_{sw}$, Equation (10) is obtained by substituting $\alpha \sim C_s/C_m$, $n = f_{sw} \cdot t$ into Equation (9).

$$t \sim C_m \cdot (1/(C_s \cdot f_{sw})) \cdot x \qquad (10)$$

Comparing Equation (2) with Equation (10), it can be seen that an inverse of a product of a capacitance of the switched capacitor $C_s$ and the switching frequency $f_{sw}$ corresponds to an equivalent resistor satisfying Equation (11).

$$R_1 \sim 1/(C_s \cdot f_{sw}) \tag{11}$$

Therefore, after setting the built-in timer, the controlling unit 12 continuously switches the switch SW4 and the switch SW5 based on the switching frequency $f_{sw}$, thereby causing the charges accumulated in the capacitor $C_m$ to be discharged stepwise. The controlling unit 12 controls the switch SW4 to be turned off (the switch SW5 is turned on) to stop the switching between the switch SW4 and the switch SW5 at a moment when the built-in timer reaches the temporal information t determined by Equation (10).

As described above, the switches SW4 and SW5 start switching on/off when the input signal is inputted to the input converting unit 11 (an operation start point), and stop switching on/off when the temporal information t is reached from the operation start point.

The arithmetic operation result output unit 14 measures the output-voltage $V_{out}$ of the nonlinear behavior unit 13A after switching between the switch SW4 and the switch SW5 is stopped, and outputs this measured value to an outside as the arithmetic operation result of the nonlinear function. After the measured output-voltage $V_{out}$ is obtained, the controlling unit 12 performs the initialization process of the nonlinear behavior unit 13A described above, and waits until the input signal is inputted to the input converting unit 11.

Here, as a constraint condition for the second embodiment, with respect to the input time interval or the input signal's sampling period $1/f_s$, when $x_{max}$ is a maximum value of the input signal, Equation (11) is substituted into Equation (5) to obtain Equation (12).

$$f_s < (C_s \cdot f_{sw})/(C_m \cdot x_{max}) \tag{12}$$

As for the sampling frequency $f_{rs}$ at a time of outputting, Equation (13) can be obtained by substituting Equation (11) into Equation (6).

$$f_{rs} > 1/\left((1/f_s) - (C_m \cdot x_{max})/(C_s \cdot f_{sw})\right) \tag{13}$$

Third Embodiment

In a third embodiment, a sigmoid function operation apparatus is realized using the nonlinear function operation apparatus 1 described above. The sigmoid function (Standard sigmoid function) is an activation function used in neuron elements existing in an intermediate layer of a neural network or an output layer of the neural network that performs a binary classification. Specifically, the sigmoid function is defined as follows:

$$\text{Sigmoid}(x) = 1/(1 + e^{-x}) \tag{14}$$

Here, when Equation (3) is used for $x \geq 0$, Equation (14) becomes as follows:

$$\text{Sigmoid}(x) = 1/(1 + EX(x)) \tag{15}$$

From a property of the sigmoid function, the following equation holds for $x \geq 0$.

$$\text{Sigmoid}(x) = 1 - \text{Sigmoid}(|x|) \tag{16}$$

Figure 8:
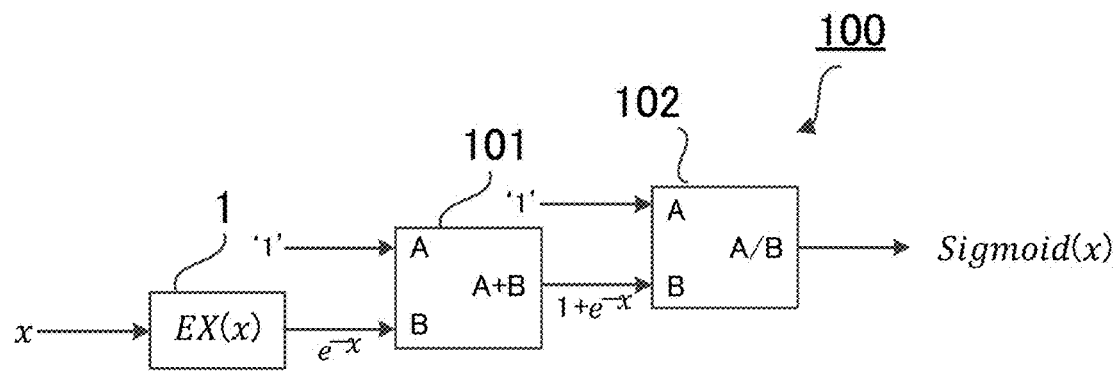
FIG. 8 is a block diagram illustrating a sigmoid function operation apparatus.

FIG. 8 is a block diagram illustrating the sigmoid function operation apparatus 100 using the nonlinear function operation apparatus 1 at an input signal $x \geq 0$. The sigmoid function operation apparatus 100 includes the nonlinear function operation apparatus 1, an adding unit 101, and a dividing unit 102. The nonlinear function operation apparatus 1 is configured as in the above-described embodiment, and outputs $EX(x)(=e^{-x})$ shown in Equation (3) for the input signal $x \geq 0$.

The adding unit 101 adds the output value "$e^{-x}$" of the nonlinear function operation apparatus 1 to the value "1" which is a natural number, and outputs "$1+e^{-x}$". The dividing unit 102 divides a numerical value "1" by an output value of the adding unit 101 or "$1+e^{-x}$", and outputs "$1/(1+e^{-x})$". That is, the dividing unit 102 calculates an inverse of the adding unit 101.

As described above, the sigmoid function operation apparatus 100 can be easily realized by using the nonlinear function operation apparatus 1 and predetermined arithmetic units.

Fourth Embodiment

In a fourth embodiment, a hyperbolic tangent function operation apparatus is realized using the nonlinear function operation apparatus 1 described above. The hyperbolic tangent function is an activation function used in neuron elements existing in an intermediate layer of a neural network. Specifically, the hyperbolic tangent function is defined as follows:

$$\tanh(x) = (e^x - e^{-x})/(e^x + e^{-x}) \tag{17}$$

Here, when Equation (3) is used for $x \geq 0$, Equation (17) becomes as follows:

$$\begin{aligned}\tanh(x) &= (e^x - e^{-x})/(e^x + e^{-x}) \\ &= (1 - e^{-2x})/(1 + e^{-2x}) \\ &= (1 - EX(2x))/(1 + EX(2x))\end{aligned} \tag{18}$$

From a property of the hyperbolic tangent function, the following equation holds for $x<0$.

$$\begin{aligned}\tanh(x) &= -\tanh(-x) \\ &= -1 \cdot \tanh(|x|)\end{aligned} \tag{19}$$

Figure 9:
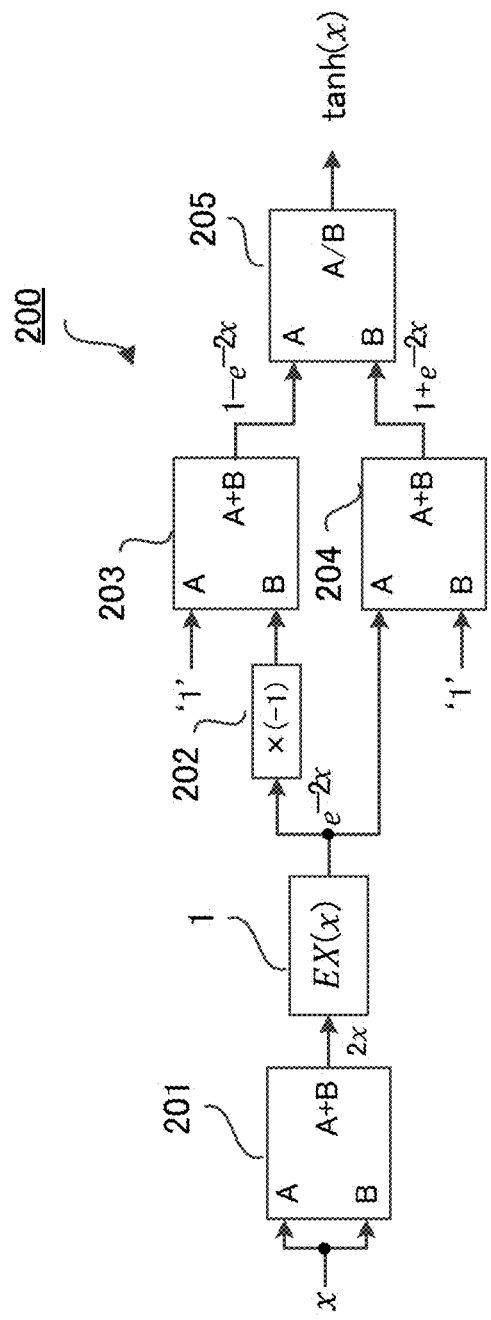
FIG. 9 is a block diagram illustrating a hyperbolic tangent function operation apparatus.

FIG. 9 is a block diagram illustrating the hyperbolic tangent function operation apparatus 200 using the nonlinear function operation apparatus 1 at an input signal $x \geq 0$. The hyperbolic tangent function operation apparatus 200 includes an adding unit 201, the nonlinear function operation apparatus 1, a code converting unit 202, adding units 203,204, and a dividing unit 205. The nonlinear function operation apparatus 1 is configured as in the above-described embodiment, and outputs EX(x)(=$e^{-x}$) shown in Equation (3) for the input signal x≥0.

The adding unit 201 adds "x" inputted to the two input terminals and outputs "2x". The nonlinear function operation apparatus 1 outputs "$e^{-2x}$" for the output "2x" of the adding unit 201. The code converting unit 202 converts a sign of the output "$e^{-2x}$" of the nonlinear function operation apparatus 1 and outputs "$-e^{-2x}$".

The adding unit 203 adds "1" to the output value "$-e^{-2x}$" of the code converting unit 202, and outputs "$1-e^{-2x}$". The adding unit 204 adds "1" to the output value "$e^{-2x}$" of the nonlinear function operation apparatus 1, and outputs "$1+e^{-2x}$". The dividing unit 205 divides the output value "$1-e^{-2x}$" of the adding unit 203 by the output value "$1+e^{-2x}$" of the adding unit 204, and outputs "$(1-e^{-2x})/(1+e^{-2x})$".

As described above, the hyperbolic tangent function operation apparatus 200 can be easily realized by using the nonlinear function operation apparatus 1 and predetermined arithmetic units.

Fifth Embodiment

In a fifth embodiment, a softmax function operation apparatus is realized using the nonlinear function operation apparatus 1 described above. The softmax function is an activation function used in neuron elements existing in an output layer of a neural network which is particularly for a multi-class classification. Specifically, if there are m neuron elements in the output layer, the softmax function applied to the i-th neuron element is defined as in Equation (20).

[Mathematical formula 1]

$$\text{Softmax}(i, x) = \frac{e^{x_i}}{\sum_{k=1}^{m} e^{x_k}} \quad (20)$$

Here, when the maximal value of the inputted value $x_i$ is $x_{max}$, Equation (20) becomes as shown in Equation (21) using Equation (3).

[Mathematical formula 2]

$$\text{Softmax}(i, x) = \frac{e^{-(x_{max}-x-i)}}{\sum_{k=1}^{m} e^{-(x_{max}-x_k)}} \quad (21)$$
$$= \frac{EX(x_{max} - x_i)}{\sum_{k=1}^{m} EX(x_{max} - x_k)}$$

As a property of the softmax function, Equation (22) holds from a definition of Equation (20).

[Mathematical formula 3]

$$\sum_{k=1}^{m} \text{Softmax}(i, x) = 1 \quad (22)$$

Figure 10:
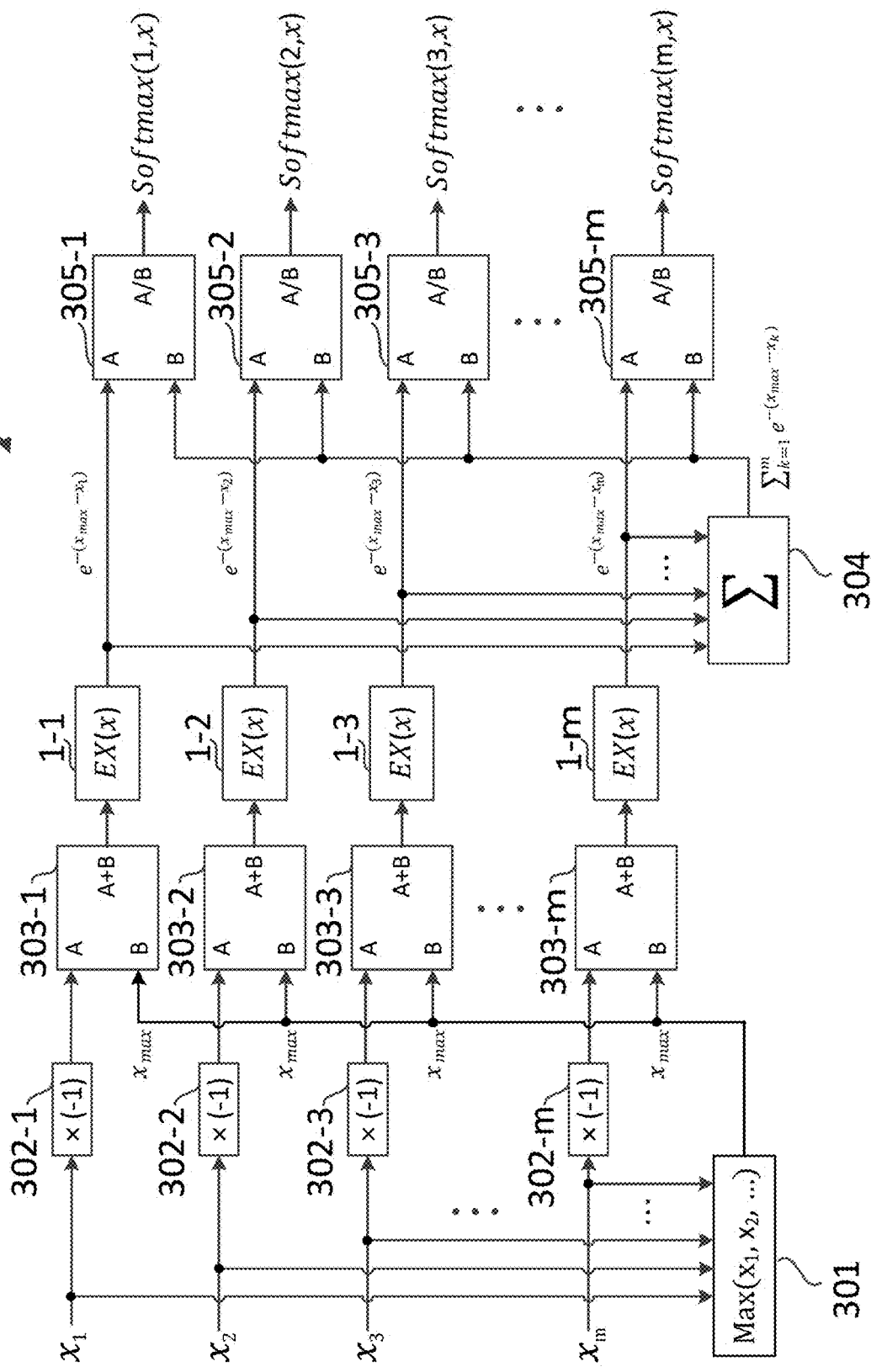
FIG. 10 is a block diagram illustrating a softmax function operation apparatus.

FIG. 10 a block diagram illustrating the softmax function operation apparatus 300 using the nonlinear function operation apparatus 1 at any input signal $x_k$ (k=1, 2, . . . , m). In the following, k represents a natural number from 1 to m.

The softmax function operation apparatus 300 includes a maximum value detecting unit 301, m code converting units 302-1, 302-2, . . . , 302-m, m adding units 303-1, 303-2, . . . , 303-m, m of the nonlinear function operation apparatus 1-1, 1-2, . . . , 1-m, a total calculating unit 304, and m dividing units 305-1, 305-2, . . . , 305-m. The nonlinear function operation apparatus 1-k is configured as in the above-described embodiment. The total calculating unit 304 is realized by combining the adding units whose number corresponds to the number of the input terminals.

The maximum value detecting unit 301 outputs the maximum value "$x_{max}$" from the m input signals "$x_k$". The code converting unit 302-k converts a sign of the input signal "$x_k$" and outputs "$-x_k$".

The adding unit 303-k adds the output value "$x_{max}$" of the maximum value detecting unit 301 to the output value "$-x_k$" of the code converting unit 302-k, and outputs "$x_{max}-X_k$". The nonlinear function operation apparatus 1-k outputs "$e^{-(x_{max}-x_k)}$" for the adding unit 303-k output "$x_{max}-X_k$".

The total calculating unit 304 calculates a sum of all the output values "$e^{-(x_{max}-x_k)}$" of the nonlinear function operation apparatus 1-k, and outputs "$\Sigma e^{-(x_{max}-x_k)}$".

The dividing unit 305-k outputs the softmax function operation value Softmax(k,x) by dividing the output value "$e^{-(x_{max}-x_k)}$" of the nonlinear function operation apparatus 1-k by the output value "$\Sigma e^{(x_{max}-x_k)}$" of the total calculating unit 304.

As described above, the softmax function operation apparatus 300 can be easily realized by using the nonlinear function operation apparatus 1-k and predetermined arithmetic units.

Sixth Embodiment

Next, a sixth embodiment will be described. In the sixth embodiment, the nonlinear behavior unit 13B illustrated in FIG. 11 is used as another exemplary nonlinear behavior unit 13 shown in FIG. 1.

Figure 11:
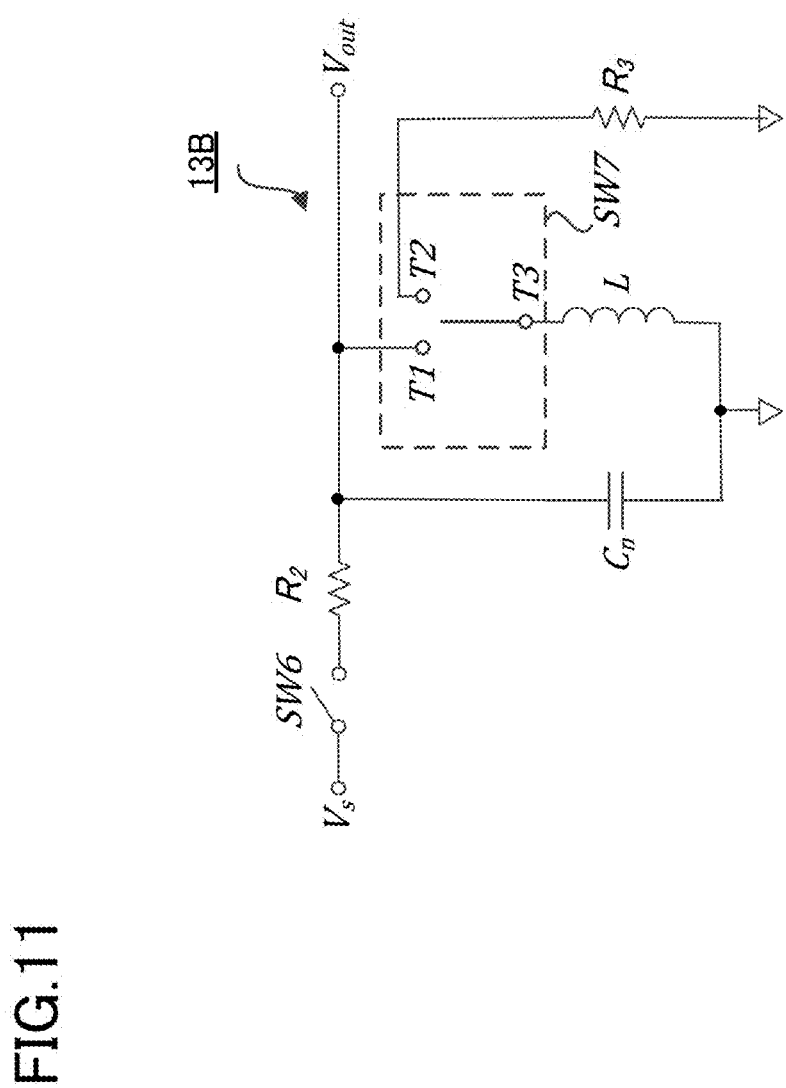
FIG. 11 is a circuit diagram illustrating an exemplary nonlinear behavior unit.

FIG. 11 is a circuit diagram illustrating the exemplary nonlinear behavior unit 13B. The nonlinear behavior unit 13B is an oscillation circuit for calculating a cosine function. The nonlinear behavior unit 13B includes switches SW6, SW7, resistors $R_2$, $R_3$, a capacitor $C_n$, and an inductor L. Note that the resistor $R_2$ is a current controlling resistance and the resistor $R_3$ is a shunt resistance.

The switch SW7 has three terminals T1, T2 and T3. The switch SW7 connects between the terminals T1 and T3 or between the terminals T2 and T3 according to a control (a selection signal) from the controlling unit 12 shown in FIG. 1.

The switch SW6 is turned on/off by the controlling unit 12 shown in FIG. 1. One end of the switch SW6 is connected to a power supply $V_s$. The other end of the switch SW6 is connected to one end of an output terminal $V_{out}$, the capacitor $C_n$ and the terminal T1 of the switch SW7 via the resistor $R_2$. The other end of the capacitor $C_n$ is grounded. The terminal T2 of the switch SW7 is grounded via the resistor $R_3$. The terminal T3 of the switch SW7 is grounded via the inductor L.

Here, an operating frequency (a natural frequency) $f_{LC}$ of the nonlinear behavior unit 13B as the oscillation circuit is as shown in Equation (23).

$$f_{LC} = 1/(2\pi\sqrt{(L \cdot C_n)}) \quad (23)$$

An oscillating motion of the nonlinear behavior unit 13B is as shown in Equation (24).

$$V_{out}/V_s = \cos(2\pi f_{LC} \cdot t) = \cos(x) \qquad (24)$$

Therefore, temporal information t equivalent to an input signal x is as shown in Equation (25).

[Mathematical formula 4]

$$t = \frac{1}{2\pi f_{LC}} \cdot \left| x - 2\pi \cdot \left(\frac{x}{2\pi}\right) \right| \qquad (25)$$

In Equation (25), [z] is the Gaussian symbol representing the largest integer equal to or less than a real number z.

Next, a processing flow of the controlling unit 12 will be described. As an initialization process, the controlling unit 12 turns on the switch SW6 of the nonlinear behavior unit 13B and connects the terminal T2 and the terminal T3 of the switch SW7. As a result, the power supply $V_s$ supplies charges to the capacitor $C_n$ via the resistor $R_2$. Consequently, the capacitor $C_n$ is fully charged by the power supply $V_s$ and a current flowing through the inductor L becomes zero.

After detecting the input signal x, the input converting unit 11 converts the input signal x into the temporal information t using Equation (25).

Next, the controlling unit 12 sets the built-in timer, starts counting, turns off the switch SW6, and connects the terminal T1 and the terminal T3 of the switch SW7. As a consequence, the capacitor $C_n$ and the inductor L are connected in parallel, and start an electric oscillation wherein the charge stored in the capacitor $C_n$ is transferred to the inductor L, and then the charge is transferred from the inductor L back to the capacitor $C_n$.

Figure 12:
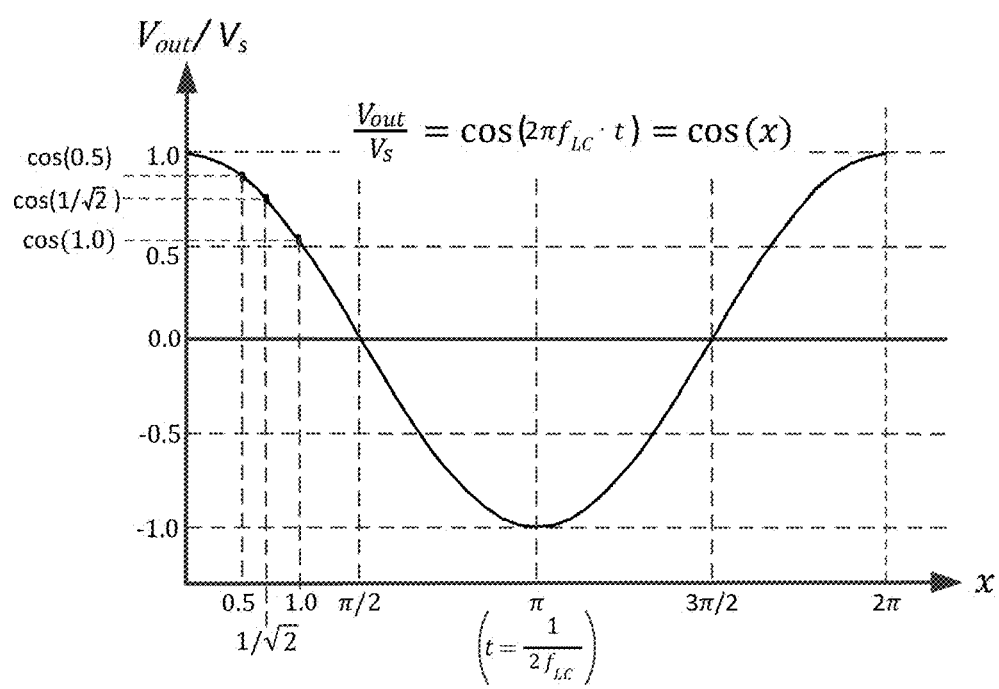
FIG. 12 is a diagram illustrating an oscillation characteristic of the nonlinear behavior unit.

FIG. 12 is a diagram illustrating the oscillation characteristic when the electric oscillation occurs in the nonlinear behavior unit 13B shown in FIG. 11. The horizontal axis represents the input signal x associated with the temporal information t in Equation (25), and the vertical axis represents an output-voltage normalized by the power supply voltage $V_s$ ($V_{out}/V_s$).

The controlling unit 12 connects the terminal T2 and the terminal T3 of the switch SW7 when the counting by the built-in timer reaches the temporal information t obtained in Equation (25). Note that the switch SW6 remains off. Consequently, the capacitor $C_n$ and the inductor L are electrically disconnected, and the current flowing through the inductor L converges to zero through the resistor $R_3$. Then, a voltage of the capacitor $C_n$ at a time when the temporal information t is reached is held.

The arithmetic operation result output unit 14 measures the output-voltage $V_{out}$ of the nonlinear behavior unit 13 and outputs this measured value to an outside as the arithmetic operation result of the nonlinear function according to Equation (24). The arithmetic operation result output unit 14 may hold the measured value of the output-voltage $V_{out}$ in the register 14-1 regardless of a status of the nonlinear behavior unit 13B. In addition, the arithmetic operation result output unit 14 may output the measured output-voltage $V_{out}$ held in the register 14-1 as quantized information on a basis of a predetermined sampling frequency using the sampling part 14-2.

Figure 13:
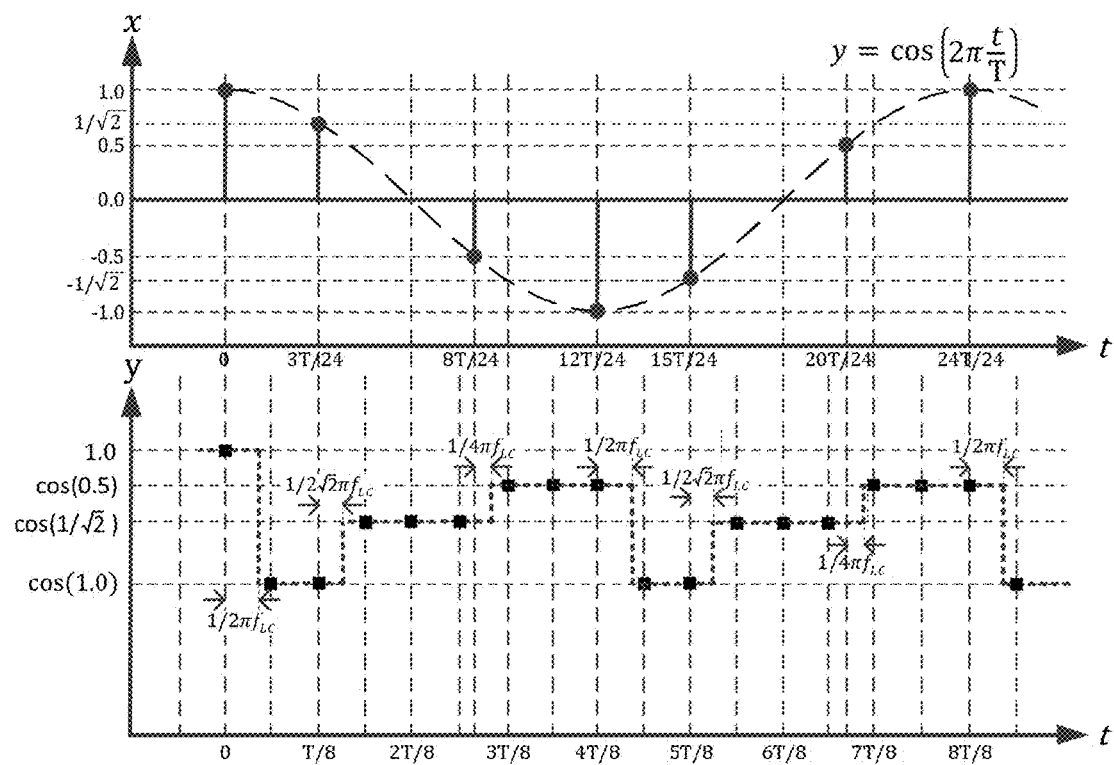
FIG. 13 is a diagram illustrating arithmetic operation results of the nonlinear function operation apparatus when input signals based on a cosine wave are inputted.

FIG. 13 is a diagram illustrating arithmetic operation results when cosine wave-based signals are inputted as the input signal x to the nonlinear function operation apparatus 1. Specifically, the input signals x are sampling signals at any time-intervals based on the cosine wave (period T) normalized to a range of −1.0 to 1.0.

It should be noted that the arithmetic operation result output unit 14 holds the arithmetic operation result of a previous input signal x in the register 14-1 until an arithmetic operation result of a new input signal x is obtained, and outputs the held arithmetic operation result being re-sampled with a T/16 cycle using the sampling part 14-2 as output signals y. Here, the processing delay and the like associated with a parasitic capacitance and the like of the nonlinear behavior unit 13 are ignored.

At t=0, the input signal is x=1.0. From this, the arithmetic operation result y=cos(1.0) is outputted at a time point t=1/(2πf$_{LC}$), which is the point of 1/(2πf$_{LC}$) delay from the input signal x entry. Then, the initialization process is executed, and the capacitor $C_n$ is recharged.

At t=3T/24, the input signal is x=1/√2. From this, the arithmetic operation result y=cos(1/√2) is outputted at a time point t=3T/24+1/(2√2·πf$_{LC}$), which is the point of 1/(2√2·πf$_{LC}$) delay from the input signal x entry. Then, the initialization process is executed, and the capacitor $C_n$ is recharged.

At t=8T/24, the input signal is x=−0.5. From this, the arithmetic operation result y=cos(0.5) is outputted at a time point t=8T/24+1/(4πf$_{LC}$), which is the point of 1/(4πf$_{LC}$) delay from the input signal x entry. Then, the initialization process is executed, and the capacitor $C_n$ is recharged.

At t=12T/24, the input signal is x=−β1.0. From this, the arithmetic operation result y=cos(1.0) is outputted at a time point t=12T/24+1/(2πf$_{LC}$), which is the point of 1/(2πf$_{LC}$) delay from the input signal x entry. Then, the initialization process is executed, and the capacitor $C_n$ is recharged.

At t=15T/24, the input signal is x=−1/√2. From this, the arithmetic operation result y=cos(1/√2) is outputted at a time point t=15T/24+1/(2√2·πf$_{LC}$), which is the point of 1/(2√2·πf$_{LC}$) delay from the input signal x entry. Then, the initialization process is executed, and the capacitor $C_n$ is recharged.

At t=20T/24, the input signal is x=0.5. From this, the arithmetic operation result y=cos(0.5) is outputted at a time point t=20T/24+1/(4πf$_{LC}$), which is the point of 1/(4πf$_{LC}$) delay from the input signal x entry. Then, the initialization process is executed, and the capacitor $C_n$ is recharged.

At t=24T/24, the input signal is x=1.0. From this, the arithmetic operation result y=cos(1.0) is outputted at a time point t=24T/24+1/(2πf), which is the point of 1/(2πf) delay from the input signal x entry. Then, the initialization process is executed, and the capacitor $C_n$ is recharged.

As is clear from FIG. 13, in the nonlinear function operation apparatus 1, if the input signal is sampling signals at any time intervals, the input time intervals thereof need to be sufficiently longer than the longest operation time 1/f$_{LC}$ of the nonlinear behavior unit 13B. Similarly, when the input signal x is a continuous analog signal, a sampling period for the analog signal x being sampling using the sampling part 11-1 is required to be sufficiently longer than the longest operation time 1/f$_{LC}$ of the nonlinear behavior unit 13B.

Specifically, if the input signals x are signals sampling at any time intervals, the nonlinear behavior unit 13B may not accept a subsequent input signal x during a period of up to 1/f$_{LC}$ from a start of the arithmetic operation (the start of oscillation). Therefore, their input-time intervals need to be longer than 1/f$_{LC}$. Also, if the input signal x is a continuous analog-signal, this is equivalent to the sampling frequency $f_s$ of the sampling part 11-1 for the input signal x having to satisfy Equation (26).

$$f_s < f_{LC} \tag{26}$$

It should be noted that in the sampling part 14-2 which is re-sampling at a time of outputting, the re-sampling frequency $f_{rs}$ of the sampling part 14-2 is required to be sufficiently larger than the sampling frequency $f_s$ for the input signal x. For example, in a period t=0 to T/8 in FIG. 13, the arithmetic operation result of the input signal x=1.0 at t=0 is obtained after t=1/(2πf$_{LC}$), which is the point of 1/(2πf$_{LC}$) delay from the input signal x entry.

On the other hand, when a new input signal x is inputted at t=T/8, if the input signal x is x=0.0, the arithmetic operation result y=1.0 can be obtained without delay. In other words, the arithmetic operation result of the input signal x at t=0 is obtained only in an interval t=1/(2πf$_{LC}$) to T/8. Therefore, in order to obtain the arithmetic operation result y of the input signal x at t=0, at least one sampling must be performed within the interval t=1/(2πf$_{LC}$) to T/8.

This is generalized as follows. When a sampling period (an input time interval) of an input signal according to the sampling part 11-1 is set to $1/f_s$, a period of $1/f_{LC}$ is occupied by the arithmetic operation at longest within one cycle, and a signal-output is delayed accordingly. The arithmetic operation result is then actually obtained only within a period of $(1/f_s)-(1/f_{LC})$. Therefore, in order for at least one re-sampling for the output y to be performed by the sampling part 14-2 within that period, the re-sampling frequency $f_{rs}$ needs to satisfy Equation (27).

$$f_{rs} > 1/((1/f_s) - (1/f_{LC})) = (f_{LC} \cdot f_s)/(f_{LC} - f_s) \tag{27}$$

It should be noted that the present invention is not limited to the above-described embodiment, but is also applicable to a design change within a scope of the matters described in the claims.

The invention claimed is:

1. A nonlinear function operation result output apparatus comprising:
   a nonlinear behavior unit configured to autonomously change an internal physical quantity according to a predetermined nonlinear characteristic;
   an input converting unit configured to convert an input signal into temporal information using a parameter indicating the predetermined nonlinear characteristic;
   a controlling unit configured to control the nonlinear behavior unit
      to start, after initializing the nonlinear behavior unit, a change in the internal physical quantity of the nonlinear behavior unit when the input signal is inputted to the input converting unit, and
      to stop, after an elapse of the temporal information, the change in the internal physical quantity of the nonlinear behavior unit; and
   an arithmetic operation result output unit configured to measure and output the internal physical quantity at a time when the change in the internal physical quantity is stopped as an arithmetic operation result of a nonlinear function having the predetermined nonlinear characteristic.

2. The nonlinear function operation result output apparatus according to claim 1, wherein the arithmetic operation result output unit comprises
   a register which stores the internal physical quantity when stopped, and
   a sampling part which samples the internal physical quantity stored in the register and outputs as arithmetic operation results of the nonlinear function having the predetermined nonlinear characteristic.

3. The nonlinear function operation result output apparatus according to claim 1, wherein
   the predetermined nonlinear characteristic is a transient characteristic, and
   the parameter is a time constant of the transient characteristic.

4. The nonlinear function operation result output apparatus according to claim 3, wherein
   the nonlinear behavior unit comprises a first charge accumulating unit which, when accumulated charges are discharged, changes a voltage according to the transient characteristic,
   the input converting unit uses the time constant proportional to a capacitance of the first charge accumulating unit to convert the input signal to the temporal information,
   the controlling unit controls the nonlinear behavior unit
   to accumulate charges in the first charge accumulating unit as the initialization,
   to start a change in the voltage of the first charge accumulating unit by discharging the charges accumulated in the first charge accumulating unit at a time when the input signal is inputted to the input converting unit, and
   to stop the change in the voltage of the first charge accumulating unit by stopping discharging the charges in the first charge accumulating unit after the elapse of the temporal information, and
   the arithmetic operation result output unit outputs, at a time when the change in the voltage is stopped, the voltage of the first charge accumulating unit as an arithmetic operation result of an inverse of an exponential function having a predetermined number as a base.

5. The nonlinear function operation result output apparatus according to claim 4, wherein the nonlinear behavior unit further comprises a resistive load, and the controlling unit is configured to control the nonlinear behavior unit to
   accumulate the charges in the first charge accumulating unit as the initialization,
   start the change in the voltage of the first charge accumulating unit by connecting the first charge accumulating unit and the resistive load in parallel at the time when the input signal is inputted to the input converting unit, and
   stop the change in the voltage of the first charge accumulating unit by disconnecting the first charge accumulating unit and the resistive load after the elapse of the temporal information.

6. The nonlinear function operation result output apparatus according to claim 5, wherein
   when a sampling frequency of the input signal is $f_s$,
   a maximum value of the input signal is $x_{max}$,
   a capacitance of the first charge accumulating unit is $C_m$, and
   a resistivity of the resistive load is $R_1$,
   then $f_s$ is less than $1/(C_m \cdot R_1 \, x_{max})$.

7. The nonlinear function operation result output apparatus according to claim 4, wherein the nonlinear behavior unit further comprises a second charge accumulating unit, and the controlling unit is configured to control the nonlinear behavior unit to
    accumulate the charges in the first charge accumulating unit as the initialization,
    start the change in the voltage of the first charge accumulating unit by connecting the first charge accumulating unit and the second charge accumulating unit in parallel at the time when the input signal is inputted to the input converting unit,
    execute repeatedly a switching operation of separating the second charge accumulating unit from the first charge accumulating unit followed by discharging charges accumulated in the second charge accumulating unit, and re-connecting the second charge accumulating unit to the first charge accumulating unit in parallel, and
    stop the change in the voltage of the first charge accumulating unit by stopping the switching operation at a time when an elapsed time reaches the temporal information.

8. The nonlinear function operation result output apparatus according to claim 7, wherein
    when a sampling frequency of the input signal is $f_s$,
    a maximum value of the input signal is $x_{max}$,
    a capacitance of the first charge accumulating unit is $C_m$,
    a capacitance of the second charge accumulating unit is $C_s$ and
    a switching frequency of the switching operation is $f_{sw}$,
    then $f_s$ is less than $C_s f_{sw}/(C_m x_{max})$.

9. A sigmoid function operation result output apparatus, comprising:
    the nonlinear function operation result output apparatus according to claim 1;
    an adding unit configured to add an output value of the nonlinear function operation result output apparatus to a natural number 1; and
    a first arithmetic operation unit configured to obtain an arithmetic operation result of a sigmoid function by calculating a reciprocal of an output value of the adding unit.

10. A hyperbolic tangent function operation result output apparatus, comprising:
    a first arithmetic operation unit configured to double an input signal;
    the nonlinear function operation result output apparatus according to claim 1, which uses an output value of the first arithmetic operation unit as an input value;
    a second arithmetic operation unit configured to subtract an output value of the nonlinear function operation result output apparatus from a natural number 1;
    an adding unit configured to add the output value of the nonlinear function operation result output apparatus to a natural number 1; and
    a third arithmetic operation unit configured to obtain an arithmetic operation result of a hyperbolic tangent function by calculating a value obtained by dividing an output value of the second arithmetic operation unit by an output value of the adding unit.

11. A softmax function operation result output apparatus, comprising:
    a maximum value detecting unit configured to detect a largest number among m input signals xk (k is a natural number from 1 to m);
    first arithmetic operation units configured to subtract each of the m input signals xk from an output value of the maximum value detecting unit;
    the nonlinear function operation result output apparatuses according to claim 1, each of which uses an output value of the corresponding first arithmetic operation unit as an input value;
    a total calculating unit configured to calculate a sum of m output values of the nonlinear function operation result output apparatuses; and
    second arithmetic operation units configured to obtain m arithmetic operation results of a softmax function by calculating m values obtained by dividing each of m output values of the nonlinear function operation result output apparatus by an output value of the total calculating unit.

12. The nonlinear function operation result output apparatus according to claim 1, wherein
    the predetermined nonlinear characteristic is an oscillation characteristic, and
    the parameter is a value associated with a natural frequency of the oscillation characteristic.

13. The nonlinear function operation result output apparatus according to claim 12, wherein
    the nonlinear behavior unit comprises an inductor, and a capacitor connected in parallel to the inductor via a switching element,
    the input converting unit uses the value associated with the natural frequency to convert the input signal to the temporal information,
    the controlling unit controls the nonlinear behavior unit
    to accumulate charges in the capacitor by turning off the switching element as the initialization,
    to start a change in a voltage of the capacitor by turning on the switching element at a time when the input signal is inputted to the input converting unit, and
    to stop the change in the voltage of the capacitor by turning off the switching element after the elapse of the temporal information, and
    the arithmetic operation result output unit outputs, at a time when the change in the voltage is stopped, the voltage of the capacitor as an arithmetic operation result of a predetermined simple harmonic oscillation function.

14. A method of outputting an arithmetic operation result of a nonlinear function, the method comprising:
    converting by an input converting unit an input signal into temporal information using a parameter indicating a predetermined nonlinear characteristic of the nonlinear function;
    controlling by a controlling unit
    to initialize a nonlinear behavior unit which autonomously changes an internal physical quantity according to the predetermined nonlinear characteristic,
    to start a change in the internal physical quantity of the nonlinear behavior unit when the input signal is inputted to the input converting unit, and
    to stop the change in the internal physical quantity of the nonlinear behavior unit after an elapse of the temporal information; and
    measuring and outputting by an arithmetic operation result output unit the internal physical quantity at a time when the change in the internal physical quantity is stopped as the arithmetic operation result of the nonlinear function.

* * * * *